(12) United States Patent
Dengler et al.

(10) Patent No.: US 11,912,132 B2
(45) Date of Patent: Feb. 27, 2024

(54) HYBRID TRANSMISSION FOR A VEHICLE

(71) Applicant: MERCEDES-BENZ GROUP AG, Stuttgart (DE)

(72) Inventors: Martin Dengler, Marbach (DE); Benjamin Bauer, Löchgau (DE); Jan Becker, Leonberg (DE); Markus Brandenburg, Esslingen (DE); Andreas Ertel, Korb (DE); Peter Hahn, Stuttgart (DE); Tobias Haerter, Stuttgart (DE); Elmar Mueller, Ehningen (DE); Jörg Weigold, Stuttgart (DE); Timo Maurer, Esslingen (DE); Preetam Birje, Bengaluru (IN)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/203,832

(22) Filed: May 31, 2023

(65) Prior Publication Data
US 2023/0302892 A1 Sep. 28, 2023

Related U.S. Application Data

(63) Continuation of application No. 18/039,009, filed as application No. PCT/EP2021/078837 on Oct. 18, 2021.

(30) Foreign Application Priority Data

Nov. 30, 2020 (DE) ...................... 10 2020 007 296.8

(51) Int. Cl.
*F16H 57/03* (2012.01)
*B60K 6/40* (2007.10)
(Continued)

(52) U.S. Cl.
CPC ............ *B60K 6/40* (2013.01); *F16H 37/0806* (2013.01); *F16H 57/037* (2013.01); *F16H 2057/02026* (2013.01); *F16H 2057/02043* (2013.01)

(58) Field of Classification Search
CPC ........... B60K 6/40; B60K 6/22; B60L 15/007; B60L 50/16; F16H 3/093
See application file for complete search history.

(56) References Cited

U.S. PATENT DOCUMENTS

| | | | | |
|---|---|---|---|---|
| 5,875,691 A | * | 3/1999 | Hata ....................... | B60K 6/365 |
| | | | | 903/952 |
| 7,786,640 B2 | * | 8/2010 | Sada ....................... | B60K 6/365 |
| | | | | 310/98 |

(Continued)

FOREIGN PATENT DOCUMENTS

| | | |
|---|---|---|
| DE | 102010002746 A1 | 9/2011 |
| DE | 112014001112 T5 | 12/2015 |

(Continued)

OTHER PUBLICATIONS

International Search Report and Written Opinion dated Jan. 14, 2022 in related/corresponding International Application No. PCT/EP2021/078837.

(Continued)

*Primary Examiner* — Derek D Knight
(74) *Attorney, Agent, or Firm* — PATENT PORTFOLIO BUILDERS PLLC

(57) ABSTRACT

A hybrid transmission for a vehicle includes a transmission input shaft extending in a transverse direction, at least one countershaft arranged parallel to the transmission input shaft, a clutch device arranged coaxially with respect to the transmission input shaft and which has at least one clutch, and a differential having a differential input gear. A rotational axis of the differential input gear is arranged parallel (Continued)

to the transmission input shaft. The transmission also includes an electric machine having a rotor with a rotor rotational axis arranged parallel to the transmission input shaft and a transmission control device. As viewed in a longitudinal direction perpendicular to the transverse direction, the differential input gear, the transmission input shaft, and a transmission controller including the transmission control device are arranged in succession in the sequence specified.

9 Claims, 2 Drawing Sheets

(51) Int. Cl.
  *F16H 57/037* (2012.01)
  *F16H 37/08* (2006.01)
  *F16H 57/02* (2012.01)

(56) References Cited

U.S. PATENT DOCUMENTS

| | | | |
|---|---|---|---|
| 7,847,450 B2 | 12/2010 | Kakuda et al. | |
| 8,448,541 B2 * | 5/2013 | Kasuya | B60L 50/16 180/65.245 |
| 9,358,865 B1 | 6/2016 | Sherry | |
| 9,802,470 B2 * | 10/2017 | Miyazawa | B60L 50/16 |
| 10,008,904 B2 | 6/2018 | Kuramochi et al. | |
| 10,391,849 B2 * | 8/2019 | Suzuki | B60K 6/26 |
| 10,495,217 B2 * | 12/2019 | Teramoto | F16H 61/0006 |
| 2013/0283972 A1 * | 10/2013 | Yamamoto | B60K 6/405 903/902 |
| 2016/0280076 A1 | 9/2016 | Yaegaki et al. | |
| 2018/0222307 A1 | 8/2018 | Fujiyoshi et al. | |
| 2019/0334469 A1 | 10/2019 | Hara et al. | |
| 2023/0302892 A1 | 9/2023 | Dengler et al. | |

FOREIGN PATENT DOCUMENTS

| | | |
|---|---|---|
| DE | 102015014096 A1 | 5/2016 |
| DE | 112009000022 B4 | 9/2017 |
| DE | 102016215184 A1 | 2/2018 |
| DE | 102018002167 B3 | 7/2019 |
| EP | 1000790 A2 | 5/2000 |

OTHER PUBLICATIONS

Office Action dated Jul. 30, 2021 in related/corresponding DE Application No. 10 2020 007 296.8.

U.S. Office Action dated Dec. 7, 2023, in corresponding/related U.S. Appl. No. 18/039,099 (19 pages).

Office Action dated Nov. 6, 2023 in related/corresponding U.S. Appl. No. 18/203,833.

* cited by examiner

HYBRID TRANSMISSION FOR A VEHICLE

BACKGROUND AND SUMMARY OF THE INVENTION

Exemplary embodiments of the invention relate to a hybrid transmission for a vehicle.

Hybrid transmissions for vehicles are known in principle from the prior art. In this respect, the substantial aim is always to achieve a structure of the transmission that is as efficient and compact as possible. For example, DE 10 2010 002 746 A1 describes the integration of an electric machine together with its power electronics system into a hybrid transmission. The structure is in this case such that the electric machine is used in a so-called inline arrangement, i.e., coaxial with the main gear shaft.

A dual clutch transmission for a motor vehicle is known from the further prior art in the form of DE 10 2018 002 167 B3. In this case, an electrohydraulic control unit is arranged in the oil chamber in order to save installation space. Since this electro-hydraulic system consists, on the one hand, of electronics, and on the other hand, of the hydraulic transmission controller, the transmission control device, which generally is to be understood as the electronic controller of the transmission, is thus also integrated into the structure of the transmission, into the transmission housing in this case.

Furthermore, DE 11 2014 001 112 T5 discloses a hybrid transmission in which a hydraulic controller and an electric machine are arranged in or on a housing of the hybrid transmission.

Finally, a hybrid transmission is known from DE 11 2009 000 022 B4, in which power electronics of an electric machine and a transmission are arranged together in an integrated housing.

In spite of these documents, there is still a great optimization potential with regard to the most compact possible design of hybrid transmissions, in particular in their axial direction along the main gear shaft, in order to achieve the most compact possible design and high power density.

Accordingly, exemplary embodiments of the present invention are directed to a hybrid transmission for a vehicle that can be made even more compact.

In a hybrid transmission for a vehicle, the known design as in the prior art initially comprises a transmission input shaft extending in a transverse direction and at least one countershaft arranged parallel thereto. In addition, a clutch device is provided, which can preferably be designed as a dual clutch, as a disconnect clutch, or as a combination thereof. In particular, the structure in the embodiment as a dual clutch comprises two countershafts; in the embodiment as a mere disconnect clutch, it comprises one countershaft. Furthermore, a differential is provided that has a differential input gear, the rotational axis of which is arranged parallel to the transmission input shaft, that is to say the direction referred to in the structure according to the invention as the transverse direction. An electric machine with a stator and a rotor is likewise arranged in such a manner that the rotor rotational axis runs parallel to the transmission input shaft. A transmission control device, via which an electronic transmission control is achieved, is provided. As viewed in a longitudinal direction arranged perpendicularly to the aforementioned transverse direction, the differential input gear, the transmission input shaft, and the transmission control device are arranged in succession in the sequence specified.

The transmission control device is understood to mean an electronic control device used to control actuator elements for shifting units of a gear set of the hybrid transmission. In a manner known per se, the actuator elements can be hydraulic actuator elements or electromechanical actuator elements, or a mixed form of both. In the case of hydraulic actuator elements, the transmission control device controls, for example, solenoid valves and a hydraulic pump. In the case of electromechanical actuator elements, the transmission control device controls servomotors, for example. Advantageously, the transmission control device is furthermore designed to control a lubricating and cooling system of the gear set in a manner known per se. Advantageously, the transmission control device can also be designed to control a cooling system of the electric machine.

Furthermore, in a vertical direction arranged perpendicularly both to the transverse direction and to the longitudinal direction, at least one part of a power electronics system for the electric machine is arranged in a manner known per se, and specifically, advantageously adjacently to the transmission control device. This part of the power electronics system comprises the structurally largest part thereof but, in any case, a circuit board of an inverter. This arrangement provides an extraordinarily efficient and compact structure. High system integration is possible in this way, enabling a correspondingly high power density of the hybrid transmission according to the invention. In addition, such a structure, which can be designed in a correspondingly compact manner, can be adapted to the installation space requirements in the construction of the vehicle in an ideal manner with regard to the packing of components.

According to the invention, it is provided that the electric machine is arranged adjacently to and above a hydraulic transmission controller in the vertical direction and overlapping it in the longitudinal direction. An installation space in which the gear set of the hybrid transmission is arranged together with the transmission input shaft and the at least one countershaft, the electric machine, the control device, and the hydraulic transmission controller can thus be utilized in an ideal manner, wherein the hydraulic transmission controller is preferably arranged in the longitudinal direction adjacently to the control device.

The hydraulic transmission controller in this case comprises at least control valves, for example solenoid valves, which are used for shifting gear actuators of the gear set. Advantageously, the hydraulic transmission controller also comprises valves which are used for controlling a lubricating and cooling system of the hybrid transmission. The hydraulic transmission controller is electrically connected to the transmission control device.

The power electronics system is understood to mean an electronics unit, which is known per se and is assigned to the electric machine. The power electronics system is used to control the electric machine.

The gear set of the hybrid transmission is understood to mean a part of the hybrid transmission serving to form different transmission speeds, that is to say different gear ratios. The gear set comprises at least the input shaft, the countershafts, and gearwheels and shifting units arranged coaxially with these shafts in each case.

The compactly constructed hybrid transmission with a high power density enables an optimized structure with regard to the crash requirements for vehicle body shell construction, which enables a further decisive advantage in such a vehicle having the hybrid transmission in the high additional masses resulting in particular from the traction battery.

An arrangement of a rotatably mounted element parallel to a direction is understood to mean that a rotational axis of the rotatably mounted element is arranged parallel to the direction. Accordingly, a parallel arrangement of two rotatably mounted elements is understood to mean that the rotational axes of the two elements are arranged in parallel. A coaxial arrangement of two other, rotatably mounted elements is understood to mean that the two other elements have the same rotational axis. The clutch device being arranged coaxially with the transmission input shaft is understood to mean that rotatably mounted clutch disks or clutch plates are arranged coaxially with the transmission input shaft.

According to an extraordinarily favorable development of the hybrid transmission according to the invention, the at least one part of the power electronics system is arranged in the vertical direction above the transmission control device when used as intended. This structure enables further optimization. In this case, the transmission control device can be arranged in the transmission oil, the power electronics system then preferably being located above the transmission control device, preferably adjacently to the electric machine as viewed in the longitudinal direction.

According to a further, very favorable embodiment of the hybrid transmission according to the invention, it can also be provided that a part of the power electronics system extends in the longitudinal direction and is arranged above the electric machine in the vertical direction. In this case, the power electronics system is thus substantially L-shaped when viewing the structure in the transverse direction and is partially adjacent, preferably above, the transmission control device and partially above the electric machine so that the power electronics system can partially surround the electric machine and thus be integrated even more efficiently into the existing installation space.

According to an extremely favorable development of the hybrid transmission according to the invention, the power electronics system can be arranged at least partially overlapping the transmission control device in the longitudinal direction and/or the transverse direction. This saves further installation space in that, depending on the dimensions of the transmission control device on the one hand and the power electronics system on the other hand, they are arranged overlapping in one or the other direction.

A further extraordinarily favorable embodiment furthermore provides that a circuit board of an inverter of the power electronics system is adjacent in the vertical direction and parallel in the longitudinal direction to a circuit board of the transmission control device. This arrangement with adjacent circuit boards, which are spaced less than 20 mm in the longitudinal direction in accordance with an exceptionally favorable development of this concept and are preferably even arranged flush in the vertical direction, creates a very efficient use of the installation space in the longitudinal direction in that these two circuit boards are preferably arranged directly adjacently to one another, for example in the same installation space as the controller, which installation space preferably lies open within a transmission housing of the hybrid transmission.

As already mentioned above, the electric machine is designed such that the rotor rotational axis extends parallel to the transmission input shaft, i.e., in the transverse direction of the structure. According to a very advantageous development, the electric machine is arranged in the longitudinal direction between the transmission input shaft and the power electronics system, wherein, as already indicated above, according to an advantageous embodiment, it is arranged in the longitudinal direction adjacently to at least one part of the power electronics system, wherein this part comprises at least the circuit board, while a further part can be arranged extending in the longitudinal direction. The latter comprises, for example, a connection plug for the DC voltage connection and an intermediate circuit capacitor, to name only a few preferred elements for the arrangement in this region.

An alternating current connection, which connects the electric machine and the power electronics system to one another, is arranged in the vertical direction below the rotor rotational axis according to a very advantageous development of the hybrid transmission according to the invention. In the intended use, it can be arranged on the bottom of the circuit board of the inverter on the one hand and the electric machine on the other hand so that the rest of the circuit board of the inverter extends upward in the vertical direction and thus next to the electric machine in the longitudinal direction.

A direct current connection for the power electronics system is arranged in the vertical direction above the rotor rotational axis and in the longitudinal direction between the rotational axis of the differential input gear and the rotor rotational axis. In particular in the case of a transverse installation of the hybrid transmission in a vehicle, in which the direction defined here as the transverse direction corresponds to the transverse direction of the vehicle, the longitudinal direction corresponds to the longitudinal direction of the vehicle, and the vertical direction corresponds to a vertical direction of the vehicle, this can be of decisive advantage since the direct current connection is thus moved back from the front region of the vehicle and therefore lies in a relatively well protected region in the event of a possible accident. The direct current connection is typically arranged on the transmission housing of the transmission, which accommodates at least the power electronics system, the transmission control device, the hydraulic transmission controller, and the gear set. As a result, it is arranged in a relatively secure region in the event of a crash.

A particularly advantageous development of the hybrid transmission according to the invention also provides that the transmission housing has a cover arranged in the longitudinal direction on the side, facing away from the transmission input shaft, of the transmission control device and of the power electronics system. The power electronics system or at least the essential part with the circuit board of the inverter and the transmission control device for the electronic control of the gear set are therefore below the cover of the transmission housing, which otherwise also comprises the differential input gear, the transmission input shaft, the at least one countershaft, the electric machine, and the hydraulic transmission controller. By means of this arrangement, the power electronics system and the transmission control device are relatively easily accessible. In the case of an aforementioned transverse installation of the hybrid transmission in a vehicle, this cover then lies in the front in the direction of travel of the vehicle, i.e., in the longitudinal direction, so that the cover is accessible from the front of the vehicle.

Further advantageous embodiments of the hybrid transmission according to the invention also result from the exemplary embodiments which are described in more detail below with reference to the figures.

BRIEF DESCRIPTION OF THE DRAWING FIGURES

DETAILED DESCRIPTION

Figure 1:
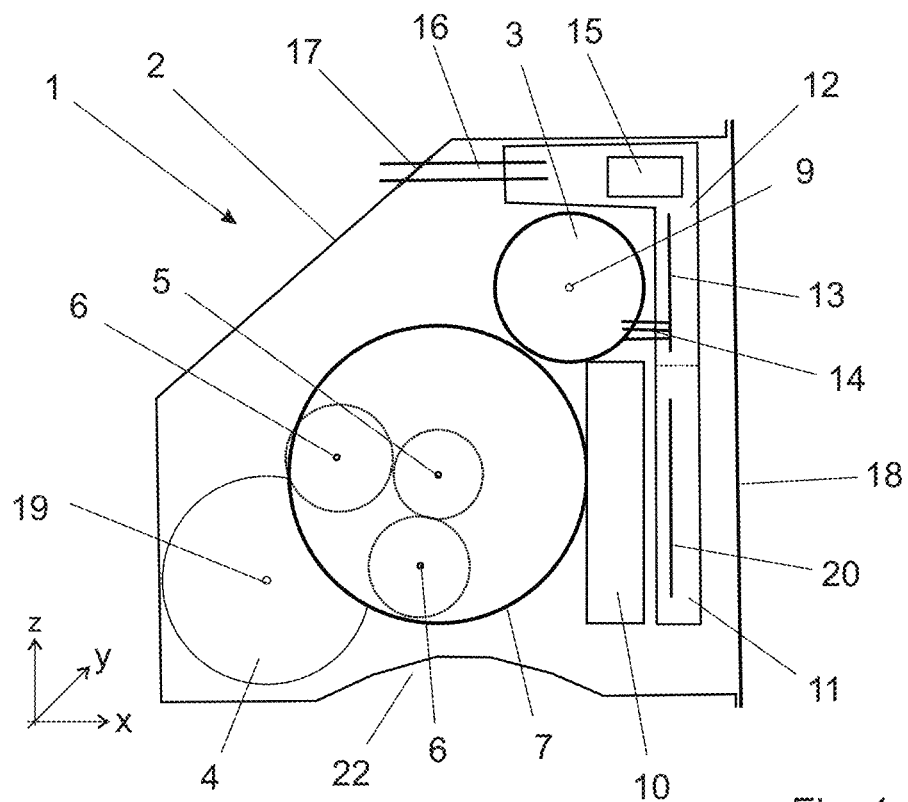
FIG. 1 is a schematic view of a possible embodiment of a hybrid transmission according to the invention from a viewing direction transverse to the longitudinal direction.
Figure 2:
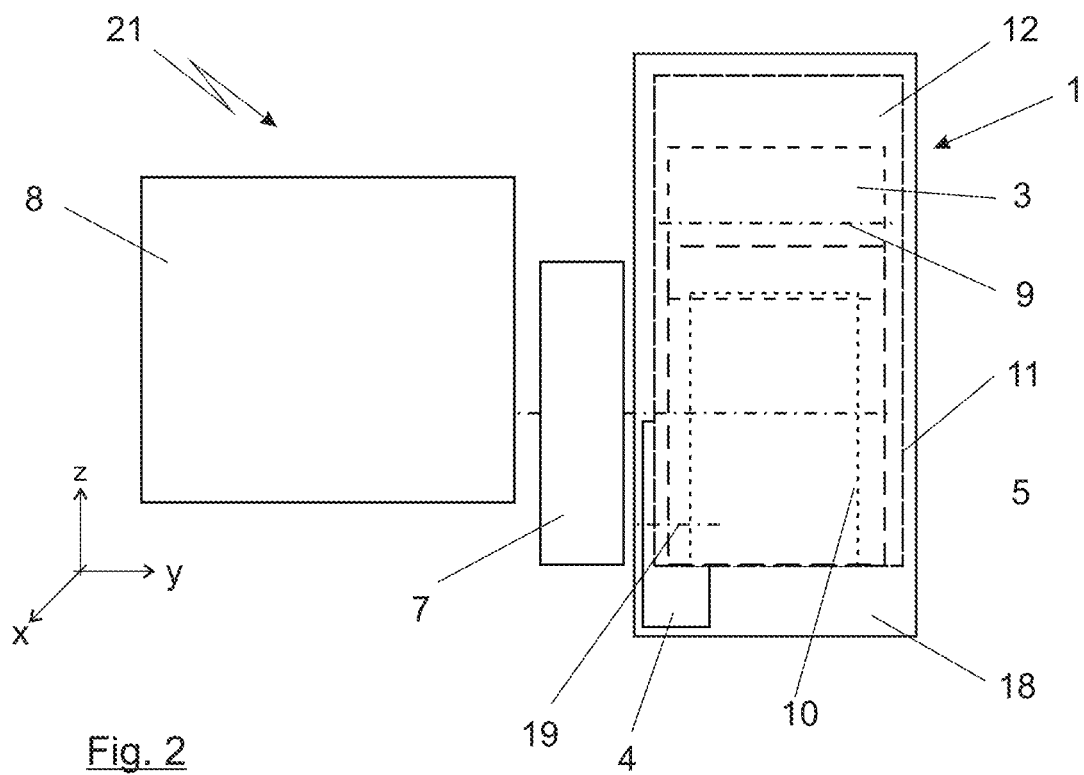
FIG. 2 shows a drive train with a hybrid transmission according to the invention in a schematic view perpendicular to the transverse direction.

FIG. 1 shows a hybrid transmission, denoted in its entirety by 1, for a vehicle (not shown here). Three directions are shown schematically in the illustration of FIG. 1. A longitudinal direction x and a vertical direction z span the drawing plane shown in FIG. 1. A transverse direction y is perpendicular thereto, projecting into the drawing plane. In the illustration of FIG. 2, the structure, together with further components, can be seen rotated further so that the longitudinal direction x extends out of the plane of the sheet and the drawing plane is spanned by the transverse direction y and the vertical direction z.

The hybrid transmission 1 in the present case is partially situated in a transmission housing denoted by 2. The hybrid transmission 1 comprises an electric machine 3 and a differential, of which a differential input gear 4 is shown here. The latter is in engagement with a transmission, which comprises a transmission input shaft 5 and, in the exemplary embodiment illustrated here, two countershafts 6. In front thereof in the transverse direction shown in FIG. 2 is a clutch device denoted by 7 and drawn in with a thicker line. This clutch device 7 is designed as a dual clutch for the case shown in FIG. 1, which can additionally comprise a disconnect clutch. As will be explained later, a structure with a disconnect clutch alone would also be conceivable.

The dual clutch transmission now illustrated here is connected to an internal combustion engine 8 via the clutch device 7, as can be seen in the illustration of FIG. 2. In the context of the invention, "connected" generally means that the connection is indirect, via a device (not shown here) for suppressing and damping rotational vibrations, for example a dual mass flywheel or the like. The connection of the clutch device 7 to the internal combustion engine 8 makes it possible to drive the differential, and thus the vehicle via the differential input gear 4, on the one hand via the internal combustion engine 8 and on the other hand via the electric machine 3 with its rotor rotational axis 9. In this case, the electric machine 3 is arranged in a so-called side-by-side arrangement with a gear set of the hybrid transmission 1.

The side-by-side arrangement of the electric machine 3 is understood to mean that the rotor rotational axis 9 is arranged axially parallel and offset to the transmission input shaft 5, and also axially parallel and offset to the countershafts 6. The electric machine 3 can, for example, be coupled to a gearwheel or a toothing of the hybrid transmission 1 via a spur gear pairing (not shown here) or also via a chain drive. This toothing can, for example, be an external toothing on a disk carrier of the clutch device or also a gearwheel in the gear set of the transmission so that the electric machine 4 can output its power, for example, to the transmission input shaft or in particular to one of the countershafts 6.

In the longitudinal direction x, which is preferably also the longitudinal direction of the vehicle so that the hybrid transmission is thus installed in the vehicle transversely to the vehicle longitudinal direction or direction of travel, a hydraulic transmission controller 10 is located adjacently to the transmission input shaft 5, and also to a transmission control device 11 which performs the task of electronic control of the gear set of the hybrid transmission 1. In order to control the electric machine 3, a power electronics system 12 is arranged in the vertical direction z above and adjacently to the transmission control device 11 and comprises at least one circuit board of an inverter, denoted by 13, which is connected to the electric machine 3 via a three-phase alternating current connection 14. In addition, an intermediate circuit capacitor 15 is schematically drawn in the power electronics system 12. Via a direct current connection 16, which is led out of the transmission housing 2 in a region denoted by 17, the power electronics system 12 and thus ultimately the electric machine 3 is connected to a traction battery (not shown here) of the vehicle equipped with the hybrid transmission 1.

In the longitudinal direction x, in the illustration of FIG. 1 on the right, the transmission housing 2 has a housing cover 18, which is preferably arranged at the front in the direction of travel. This makes the structure of the power electronics system 12 and of the transmission control device 11 easily accessible, while the direct current connection 16, which is led out of the transmission housing 2 in the region denoted by 17, is moved to the rear in a corresponding manner in order to provide the highest possible safety in the event of a crash of a vehicle equipped with the hybrid transmission 1.

Since this region 17 for implementing the direct current connection on the housing 2 is located in the longitudinal direction x between the rotor axis 9 of the electric machine 3 and a rotational axis 19 of the differential input gear 4, and thus is removed in the longitudinal direction x both from the front of the transmission housing 2 with its cover 18 and from the opposite side, a high degree of safety is ensured in the event of a crash.

The power electronics system 12 substantially comprises a primary subregion with the circuit board 13 of the inverter, which is arranged in the longitudinal direction x between the cover 18 and the electric machine 3 so that the arrangement of the alternating current connection below the rotor rotational axis 9 of the electric machine 3 ensures that the installation space next to the electric machine 3 is ideally utilized. A further part, for example with the direct current connection 16 and the intermediate circuit capacitor 15, of the power electronics system 12 can extend in the longitudinal direction x and is arranged adjacently to the electric machine in the direction of the vertical direction z so that the latter is thus partially enclosed by the power electronics system 12. In this case, the hydraulic transmission controller 10 is arranged overlapping the electric machine 3 between the transmission control device 11 and the gear set with its input shaft 5 and the countershafts 6 so that it can interact directly with the corresponding components within the transmission, which makes the structure likewise compact and very efficient with regard to the required cable lengths.

A circuit board 20 of the transmission control device 11 is arranged adjacently in the vertical direction Z and parallel in the longitudinal direction x to the circuit board 13 of the inverter. In the longitudinal direction x, these should preferably have a distance from one another of less than 20 mm. Ideally, they are arranged flush with one another along the vertical direction z.

In the illustration of FIG. 2, with a view of the cover 18 of the transmission housing 2, it can now be seen that the differential input gear 4, the countershafts 6 (not shown here), and the transmission input shaft 5 are arranged within the transmission housing, as are the electric machine 3 and the hydraulic transmission controller 10, as well as the combination of the transmission control device 11 at the bottom and the power electronics system 12, overlapping it, at the top. In this scenario, a crankshaft of the internal combustion engine 8 indirectly drives the clutch device 7, which can be designed here as a dual clutch. All in all, the structure can be realized extremely compactly, primarily in the transverse direction y, i.e., along the main axes of the transmission, e.g., the transmission input shaft 5. Accordingly, the structure can be installed in the vehicle transversely to the direction of travel so that the schematic representation of FIG. 2 substantially corresponds to a viewing direction toward the front of a vehicle equipped with the drive train 21 shown there.

In this case, sufficient installation space remains in the transmission housing 2 to adapt the outer contour of this transmission housing 2 to further components and structures required in the vehicle. In the illustration of FIG. 1, for example in the lower part of the transmission housing 2 in the vertical direction z, an optional recess denoted by 22 can thus be seen, in the region of which components of the steering system of the vehicle could particularly preferably be arranged outside the transmission housing 2. The optional recess 22 is advantageously arranged between the rotational axis 19 of the differential input gear 4 and the transmission control device 11 as viewed in the longitudinal direction x.

Figure 3:
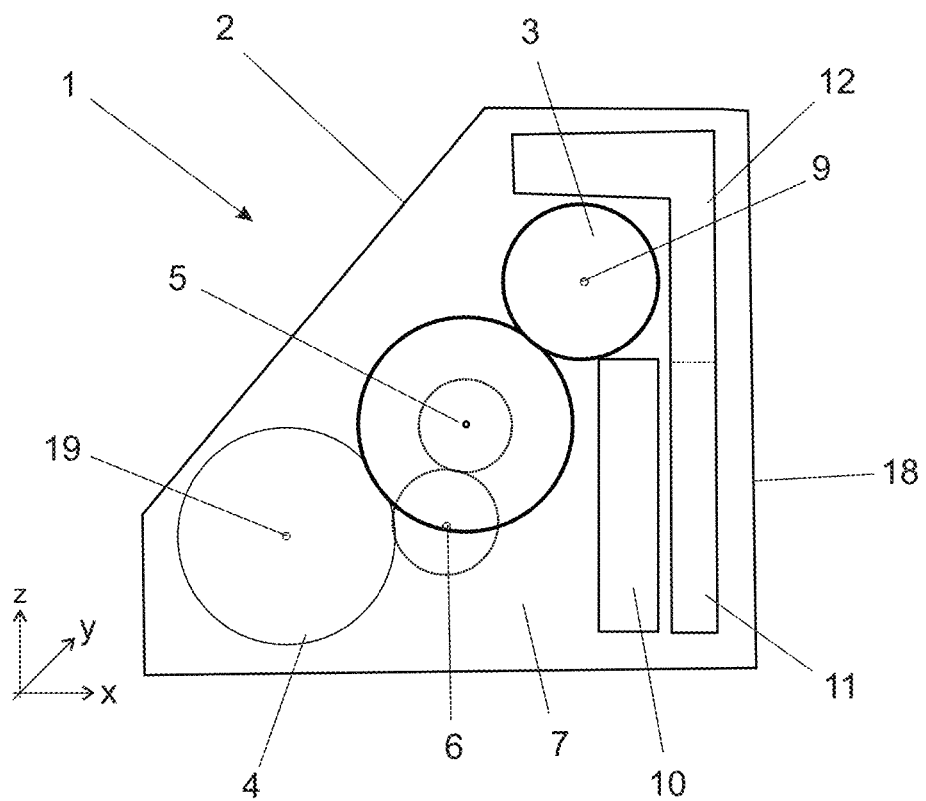
FIG. 3 shows an alternative embodiment of the hybrid transmission according to the invention in an illustration analogous to that in FIG. 1.

The transmission housing 2 is shown again in the illustration of FIG. 3. The optional recess 22 is not present here; the cover 18 of the transmission housing 2 is not explicitly shown, in contrast to the illustration in FIG. 1. Otherwise, the structure shown in FIG. 1 should largely correspond to the structure shown in FIG. 3. Here too, the differential input gear 4 can be seen, with its rotational axis 19, as can the electric machine 3 with its rotor axis 9. A hydraulic transmission controller 10 is illustrated, and the transmission control device 11 is arranged adjacently thereto in the longitudinal direction x, wherein the explicit representation of the circuit board 20 has been omitted. Thereabove is the power electronics system 12, wherein here too, the circuit board of the inverter, electrical connections, and details are omitted in the illustration.

The primary difference is now that the clutch device 7 is designed here as a mere disconnect clutch. Unlike the structure in the illustration of FIG. 1, there is no control of a dual clutch transmission with two countershafts 6; rather, there is a simple hybrid transmission with a modified gear set with an input shaft 5 and a single countershaft 6, via which the differential input gear 4 is driven accordingly. The structure could be implemented, for example, in the form of a simple automated manual transmission which is suitably hybridized with the electric machine 3. The latter is arranged in the side-by-side arrangement described above in relation to the modified gear set in the hybrid transmission 1. The decisive structure of the integrated controller with the power electronics system 12 and the transmission control device 11 is identical to the exemplary embodiment described above.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

What is claimed is:

1. A hybrid transmission for a vehicle, the hybrid transmission comprising:
   a transmission input shaft extending in a transverse direction;
   at least one countershaft arranged parallel to the transmission input shaft;
   a clutch device arranged coaxially with the transmission input shaft and having at least one clutch;
   a differential having a differential input gear, wherein a rotational axis of the differential input gear is arranged parallel to the transmission input shaft;
   an electric machine having a rotor and a stator, wherein a rotor rotational axis is arranged parallel to the transmission input shaft;
   a transmission control device;
   wherein, as viewed in a longitudinal direction arranged perpendicular to the transverse direction, the differential input gear, the transmission input shaft, and a transmission controller comprising the transmission control device are arranged in succession in the recited sequence,
   wherein at least one part of a power electronics system for the electric machine is arranged adjacent to the transmission control device in a vertical direction, which is arranged perpendicular to the transverse direction and perpendicular to the longitudinal direction, and
   wherein a hydraulic transmission controller is arranged overlapping the electric machine between the transmission control device and a gear set with the transmission input shaft and the at least one countershaft so that the hydraulic transmission controller is configured to interact directly with corresponding components within the hybrid transmission, and
   wherein the hybrid transmission further comprises
      a circuit board of an inverter of the power electronics system arranged adjacently in the vertical direction and parallel in the longitudinal direction to a circuit board of the transmission control device, wherein the circuit board of the inverter of the power electronics system is spaced less than 20 mm from, and arranged in the vertical direction flush with, the circuit board of the transmission control device;
      a direct current connection for the power electronics system arranged in the vertical direction above the rotor rotational axis and in the longitudinal direction between the rotational axis of the differential input gear and the rotor rotational axis; and
      a transmission housing accommodating at least the differential input gear, the transmission input shaft, the at least one countershaft, the electric machine, the transmission control device, the hydraulic transmission controller and the power electronics system, wherein the transmission housing comprises a housing cover arranged in the longitudinal direction on a side, facing away from the transmission input shaft, of the transmission control device and of the at least one part of the power electronics system.

2. The hybrid transmission of claim 1, wherein the at least one part of the power electronics system arranged adjacently to the transmission control device is arranged above the transmission control device in operation.

3. The hybrid transmission of claim 1, wherein a further part of the power electronics system extends in the longitudinal direction and is arranged above the electric machine in the vertical direction.

4. The hybrid transmission of claim 1, wherein the power electronics system is arranged at least partially overlapping the transmission control device in the longitudinal direction or in the transverse direction.

5. The hybrid transmission of claim 1, wherein a rotor rotational axis of the electric machine is arranged in the longitudinal direction between the transmission input shaft and the at least one part of the power electronics system.

6. The hybrid transmission of claim 1, wherein the electric machine is arranged in the longitudinal direction adjacent to the at least one part of the power electronics system.

7. The hybrid transmission of claim 5, further comprising: an alternating current connection, connecting the electric machine and the power electronics system, arranged in the vertical direction below the rotor rotational axis.

8. The hybrid transmission of claim 1, wherein the transverse direction, the longitudinal direction, and the vertical direction, in a case of a hybrid transmission installed in a vehicle, correspond respectively to the vehicle transverse direction, the vehicle longitudinal direction, and the vehicle vertical direction.

9. The hybrid transmission of claim 1, wherein the clutch device has a dual clutch or a disconnect clutch.

* * * * *